United States Patent [19]

Grawunde

[11] 4,305,566
[45] Dec. 15, 1981

[54] FLUID CONTROL VALVE

[75] Inventor: Frederick G. Grawunde, Painesville, Ohio

[73] Assignee: Fluid Controls, Inc., Mentor, Ohio

[21] Appl. No.: 89,719

[22] Filed: Oct. 31, 1979

[51] Int. Cl.³ ............... F16K 31/383; F16K 31/40
[52] U.S. Cl. ........................... 251/30; 251/44; 251/282; 137/491; 137/492.5; 137/495
[58] Field of Search .............. 251/30, 43, 44, 138, 251/282; 137/489, 492.5, 491, 495

[56] References Cited

U.S. PATENT DOCUMENTS

| | | | |
|---|---|---|---|
| 2,271,047 | 1/1942 | Sloan | 251/37 |
| 2,882,922 | 4/1959 | Schindel | 251/43 |
| 3,100,103 | 8/1963 | Bullard | 251/30 |
| 3,677,287 | 7/1972 | Morris | 251/43 X |
| 3,757,821 | 9/1973 | Fujiwara | 251/30 X |
| 3,799,497 | 3/1974 | Zeuner | 251/30 |
| 3,818,927 | 6/1974 | Zeuner | 137/110 |
| 3,903,919 | 9/1975 | Zeuner | 251/30 X |
| 3,905,575 | 9/1975 | Zeuner et al. | 251/30 |
| 3,977,649 | 8/1976 | Zeuner et al. | 251/82 |
| 4,073,464 | 2/1978 | Hansen et al. | 251/30 X |

OTHER PUBLICATIONS

"Solenoid Operated Cartridge Valves", Wayland A. Tenkku, 9/77

Primary Examiner—A. Michael Chambers
Attorney, Agent, or Firm—Watts, Hoffmann, Fisher & Heinke Co.

[57] ABSTRACT

A normally open, two stage solenoid actuated flow control valve having a pressure relief function, in which a poppet assembly comprising a spring biased poppet, a range spring and a spring adjusting screw, controls the communication of balancing fluid pressure to a primary valve member. The adjustment screw includes an axial extending shaft engageable with an externally extending adjustment stem; rotation of the stem effects concurrent rotation and axial displacement of the adjusting screw within the poppet sleeve. An armature is disposed in axial alignment with and intermediate the stem and the poppet assemby so that the poppet assembly can be driven to engagement with its associated seat by the actuation of the solenoid or by the direct axial displacement of the adjustment stem.

8 Claims, 2 Drawing Figures

FLUID CONTROL VALVE

BACKGROUND OF THE INVENTION

1. Field of the Invention

This invention relates generally to solenoid operated flow control valves and more particularly to multistage, solenoid actuated flow control valves having a pressure relief function.

2. Description of the Prior Art

Multi-stage flow control valves are usually employed in fluid systems operating at high fluid pressures. To operate a simple on/off flow valve in a high pressure environment would require a rather massive operating mechanism. For this reason, valves have been devised which operate in stages so that small operating forces can be used to control high pressure flow. In these types of valves, pressures in a first stage is released by an operating member, and the depletion of pressure in this stage, reduces a biasing force on a second stage primary valve member to effect its opening, thereby allowing fluid flow through the valve between an inlet and an outlet.

The first or pilot stage of the valve is typically operated by a solenoid. The primary valve member or piston, forming the second stage, is urged towards the open position by the fluid pressure at the inlet and urged towards a closed position, that is, a position interrupting flow between the inlet and the outlet, by a piston closure spring. Generally, a poppet in the pilot stage controls the application of biasing fluid pressure to the primary piston. When the poppet is seated, fluid pressure is applied to an effective pressure area on the piston and produces a force which balances the force applied to the inlet side of the piston by the incoming fluid pressure and thus, the closure spring will move and maintain the piston in its closed position. When the poppet opens, the balancing fluid pressure is released into the outlet, enabling the inlet fluid pressure to overcome the spring force, causing the piston to move to its open position and allow communication between the inlet and outlet of the valve.

Generally, an armature is disposed within the valve body adjacent the poppet, so that solenoid-induced movement in the armature causes attendant movement in the poppet towards and away from its associated seat. In a normally open type valve, the energization of the solenoid seats the poppet to effect closure of the primary piston and interrupt flow between the inlet and the outlet. De-energizing the solenoid allows the poppet to unseat and exhaust the biasing pressure holding the primary piston in its closed position thereby allowing fluid flow between the inlet and the outlet.

More sophisticated versions of multi-stage flow control valves include a pressure relief function which often takes the form of a spring biased poppet. In this type of valve, a solenoid operated armature effects movement in a spring biased poppet, towards and away from its associated seat. In the normally open configuration of this type of valve, the spring biased poppet, which although driven to its closed position by the solenoid, can be opened by a predetermined pressure at the inlet of the valve.

This type of valve is very useful in high pressure hydraulic systems where it can serve two purposes. First, it can be used to dump hydraulic pressure by appropriate actuation of the solenoid. Secondly, it can operate as a regulating valve and maintain a relatively constant system pressure determined by the biasing force on the poppet.

Typically, a normally open pressure relief valve, includes an armature disposed within the valve body adjacent a poppet biasing spring. Energizing the solenoid causes attendant movement in the armature which drives or compresses the biasing spring against the poppet, causing it to engage its valve seat. When the fluid pressure on the poppet exceeds the forces applied to it by the armature and biasing spring, the poppet is forced open and fluid pressure is exhausted through the valve seat. As long as the solenoid remains energized, the poppet will re-engage its valve seat once the excessive fluid pressure has been exhausted.

Certain problems and shortcomings have been recognized in prior art solenoid operated pressure relief valves. Many prior art valves employ a poppet return spring between the poppet and its associated seat which urges the poppet away from the seat to provide a positive opening force. This spring force is normally much less than the poppet biasing force applied to the poppet whenever the solenoid is energized. Nevertheless, the actual poppet biasing closure force is then reduced by the oppositely acting poppet return spring. These competing spring forces often made precise valve adjustments impossible. Secondly, because the armature compresses the poppet biasing spring to effect poppet closure, the pressure relief setting is partially affected by the extent of armature movement. Thirdly, in many of the prior art valves, partial valve disassembly was necessary to adjust the poppet biasing spring.

The problems present in the prior suggested valves were recognized and an attempt was made to construct a valve free of the identified shortcomings. The valve included a poppet valve assembly comprising a sleeve slidably supported within the valve body, which carried: a poppet, a poppet biasing spring and a biasing spring adjustment nut. Unlike the prior suggested valves, the armature effected movement in the poppet valve assembly and did not act directly against the poppet biasing spring. This configuration allowed precise control of the biasing force on the poppet and made its operation substantially independent of the poppet return spring and the extent of armature movement. In this valve, the armature moved the entire poppet assembly to effect poppet closure. This arrangement isolated the poppet biasing spring so that it was not affected by the forces of either the armature or the poppet assembly return spring.

This valve also included an external adjusting stem which was coupled to the biasing spring adjusting nut so that adjustments could be made to the poppet biasing spring without requiring valve disassembly.

Although this valve was partially successful in solving the problems of the prior art valves certain problems still remained. It was found, that frequently the movement in the poppet carrier was inhibited by the external adjustment coupling resulting in valve instability or inoperativeness. It was also found, that unauthorized access to the interior of the valve could be easily accomplished and it was desirable to have a more tamperproof valve. Finally, a provision for manually actuating the valve in the absence of electrical power was deemed desirable to facilitate checking and installation of the valve.

SUMMARY OF THE INVENTION

The present invention provides an improved normally open solenoid actuated flow control valve having a pressure relief function. The pressure relief setting is externally adjustable and does not necessitate valve disassembly. The valve also includes a provision for manually actuating the valve even in the absence of electrical power.

In a preferred embodiment, the valve is a two stage valve and includes a valve body defining an inlet and an outlet and a primary piston slidably supported within the body for controlling the communication between the inlet and outlet. The primary piston, which is part of the second stage, is urged towards an open position (the position communicating the inlet with the outlet) by the inlet fluid pressure impinging on the inlet side of the piston. Preferably, a piston closure spring in cooperation with biasing fluid pressure urges and maintains the piston in a closed position. The biasing fluid pressure is preferably inlet pressure applied to an opposed effective pressure area on the piston which generates a force that opposes and balances the force exerted on the inlet side of the piston by the fluid pressure at the inlet. A poppet valve assembly within the valve body, forms a part of the first or pilot stage of the valve and controls the application of the inlet fluid pressure to the opposed effective pressure area on the primary piston. When the fluid developed forces on the piston are balanced, the piston closure spring becomes effective to move and maintain the piston in its closed position, interrupting flow between the inlet and the outlet.

The poppet valve assembly includes a sleeve supporting a poppet valve on one end and threadedly receiving an adjustment screw near its other end. A range spring is captured between the poppet and the adjustment screw, and applies a force to the poppet valve which is a function of the axial position of the adjustment screw in the sleeve.

The poppet valve assembly is slidably disposed within the valve body and is axially movable to effect poppet movement towards and away from an associated poppet seat. When the poppet is seated, inlet fluid pressure is directed to an effective pressure area on the piston to balance the force exerted by the incoming fluid pressure on the inlet side of the piston. When the poppet assembly moves and unseats the poppet, the biasing fluid pressure acting on the primary piston is discharged into the outlet thereby enabling the fluid pressure on the inlet side of the piston to overcome the piston closure spring force and cause the primary piston to open and establish communication between the inlet and the outlet.

In accordance with a feature of the invention, the adjusting screw threadedly received by the poppet assembly includes an axially extending shaft having a perpendicularly disposed pin on one end. An adjusting stem extends through and is rotatably held at one end of the valve body and includes a slot for engaging the perpendicularly disposed pin. The engagement between the slot and pin prevents relative rotation between the two elements while allowing relative axial displacement between the shaft and the adjusting stem. Rotation of the stem then effects rotation in the adjustment screw causing axial displacement of the adjustment screw within the sleeve.

An armature of the solenoid is disposed immediately adjacent the poppet valve assembly. A solenoid coil of conventional construction surrounds a portion of the valve body and is located concentric with the armature. Energizing the solenoid causes movement in the armature and in the poppet valve assembly towards the valve seat. When the poppet is seated, inlet pressure is applied and maintained on the effective pressure area of the piston, thus balancing the piston opening force applied by the fluid at the inlet. The piston is moved to and maintained in its closed position by the closure spring. De-energizing the solenoid allows the poppet valve assembly to move away from the valve seat and exhaust the balancing inlet pressure acting on the primary piston, allowing the piston to open.

The present construction provides an adjustable solenoid operated pressure relief valve in which biasing forces on the poppet are isolated from the armature and poppet return springs. More importantly, the poppet closure force is adjustable from outside the valve by an arrangement which does not effect or degrade valve operability.

According to another feature of the invention, the adjusting stem which extends through the end of the valve body can be displaced axially by the application of force to its exposed end. It is located within the body immediately adjacent the solenoid armature so that axial movement in the stem causes abutting engagement with the armature and moves it in a direction towards the poppet valve assembly. Axial movement of the stem will then effect movement in the poppet carrier and effect closure of the poppet.

This feature allows the solenoid valve to be actuated or tested even in the absence of electrical power. Because the movement in the stem acts against the armature, which in turn moves the entire poppet assembly into engagement with the poppet seat, the application of force to the stem does not affect the pressure relief setting. Thus, a complete valve checkout can be accomplished without requiring that the valve be connected to a power source.

Further features and a fuller understanding of the present invention will be obtained by reading the following detailed description made in connection with the appended drawings.

DESCRIPTION OF THE PREFERRED EMBODIMENT

Figure 1:
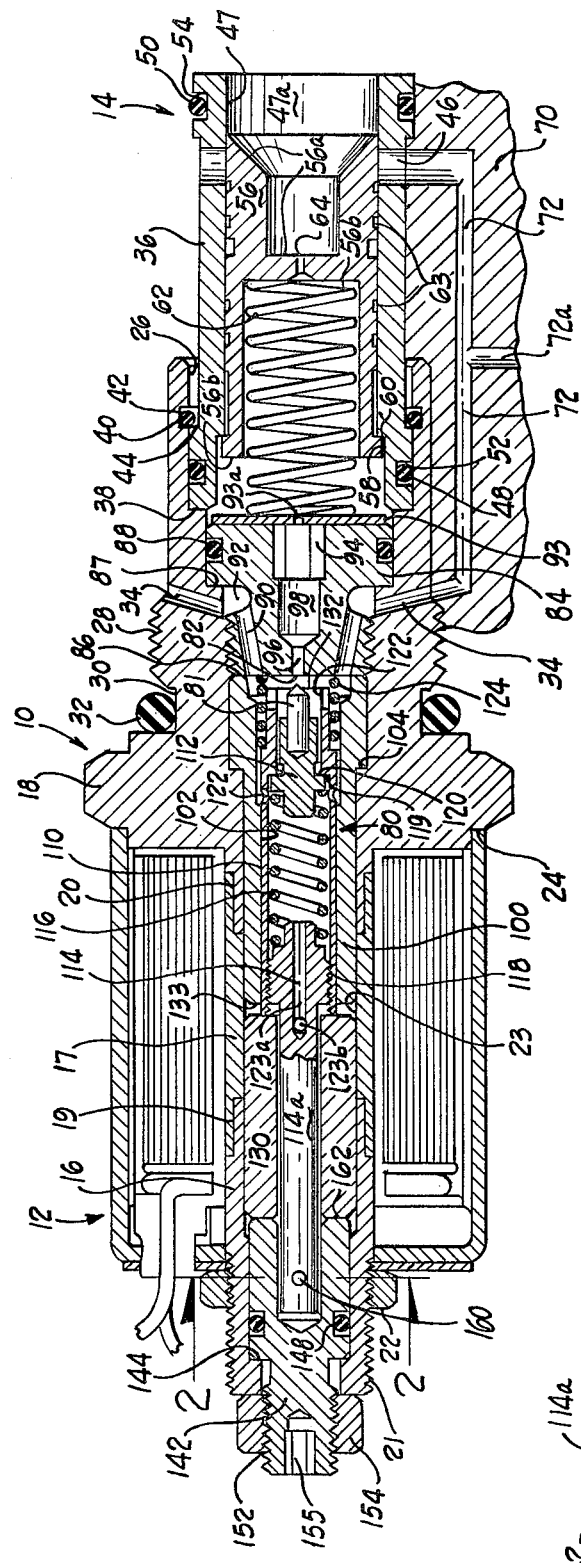
FIG. 1 is a cross-sectional view of a two-stage, normally open, solenoid control valve constructed in accordance with the present invention.

FIG. 1 illustrates the overall construction of a solenoid actuated control valve constructed in accordance with the present invention. The control valve comprises a valve body 10, a solenoid coil assembly 12 and a primary piston assembly 14.

The valve body 10 is preferably made up of three interfitting sections as indicated in FIG. 1 by the reference characters 16, 17 and 18. The three sections 16, 17, and 18 are sized to provide an interference fit at junctures 19 and 20 and are furnace brazed to maintain assembly. The body section 17 is preferably constructed of a nonmagnetic material such as stainless steel, whereas, sections 16 and 18 are preferably constructed of carbon steel so that spaced magnetic poles are established when the solenoid 12 is energized.

When assembled, the three sections 16, 17 and 18 define an elongate tubular portion of the valve body about which the solenoid assembly 12 is coaxially mounted. The section 16 includes external threads 21 for receiving a locknut 22 which fixes the solenoid assembly 12 between itself and a radial, stepped face 24 of the valve body section 18. The tubular portion further defines a multi-step through bore 23.

The valve body section 18 includes a multi-stepped end bore 26, an externally threaded portion 28 and an annular groove 30 for carrying a sealing O-ring 32. A plurality of skewed radial passages 34 that open into a small diameter portion of the bore 26, are circumferentially spaced immediately adjacent the threaded portion 28 of the valve body section 18.

The body section 18 mounts the second stage of primary piston assembly 14 which is of conventional construction. The assembly 14 includes a sleeve 36 telescoped within the bore 26 of the section 18. A radial end wall of the sleeve 36 abuts a shoulder formed in the bore 26, as indicated by the reference character 38, to positively locate the assembly 14 within the section 18. A wire ring 40 carried by an internal groove 42 concurrently engages a step 44 of the sleeve 36 and thus locks the assembly 14 within the bore 26.

The sleeve 36 includes spaced radial passages or ports 46 and a through-bore 47. The right end of the bore 47 as viewed in FIG. 1 forms an inlet 47a to the control valve. Sealing O-rings 48, 50 are carried by respective annular grooves 52, 54. The bore 47 of the sleeve 36 slidable supports an internal piston 56 which blocks fluid flow between the inlet 47a and the radial passages 46 when the piston is in its rightmost position, illustrated in FIG. 1. The piston includes a radially extending shoulder 58 engageable with an internal shoulder 60 on the sleeve and establishes the rightmost position of the piston 56 within the sleeve 36. A spring 62 biases the piston 56 towards its rightmost position as viewed in FIG. 1.

The piston 56 includes a plurality of fluid pressure balancing grooves 63, spaced axially along the external surface of the piston 56. A relatively small diameter orifice 64 communicates fluid pressure from the inlet 47a to the spring biased side of the piston 56.

In use, the control valve shown in FIG. 1 is intended to be mounted within a housing 70 by means of the externally threaded portion 28. When mounted within the housing, the O-ring 32 sealingly engages an internal cylindrical surface of the housing 70 (not shown) and the end opening 47a of the bore 47 defines the inlet to the valve. The radial passages 46 in the sleeve 36 and the offset radial passages 34 in the body section 18 of the valve communicate with a common passage 72 and form an outlet 72a. It can be seen in FIG. 1 that the leftward movement of the piston 56 will uncover the radial passages 46 and thus the inlet 47a will be communicated with the outlet 72a.

The position of the piston 56 within the sleeve 36 is a function of the pressure differential across the orifice 64. As seen in FIG. 1, inlet fluid pressure applied to the piston surfaces 56a on the right side of the piston 56, will urge the piston 56 towards the left. Conversely, fluid pressure communicated to the spring side of the piston by the orifice 64 will act on the piston surfaces 56b and urge the piston 56 towards the right. The closure spring 62 also urges the piston 56 to the right. As long as substantially equal pressures are applied to the opposed effective pressure areas defined by the surfaces 56a, 56b, the piston will remain in the flow interrupting position illustrated in FIG. 1. If the fluid pressure applied to the surface 56b is depleted or diminished, the fluid pressure at the inlet 47a will overcome the spring force of the spring 62 and will cause the piston 56 to move to the left and expose the radial ports 46.

The movement in the piston assembly 56 is controlled by the position of a poppet assembly 80 in the first or pilot stage of the valve. The assembly 80 includes a poppet valve 81 engageable with an associated poppet seat 82. The seat 82 is carried by an insert 84 threaded into the body section 18. The insert 84 abuts a radial face of an elongate tubular insert 100, indicated by the reference character 86 and carries an O-ring 88 that sealingly engages the internal wall of the stepped bore 26. The insert 84 includes a plurality of skewed axial passages 90 and a necked portion which defines a chamber 92 that communicates the passages 90 with the skewed radial passages 34.

An orifice plate 93 having an orifice 93a is positioned immediately adjacent the insert 84 and restricts the rate of fluid flow into a hex-shaped bore 94, formed on one end of the insert. The piston biasing spring 62 maintains the orifice plate 93 in its illustrated position. A relatively small diameter end bore 96 is located at the opposite end of the insert 84, its end opening defining the poppet seat 82. The bores 94, 96 are communicated with each other by an intermediate cylindrical bore 98 that tapers into the small diameter bore 96. Fluid exhausted through the end bore 96, when the poppet 81 is unseated, is communicated to the outlet 72a by the serial passages 90, 92, 34, and 72.

The poppet assembly 80 is slidably and also preferably rotatably supported within the elongate tubular insert 100 which is loosely fitted into the internal bore 23 defined by the body sections 16, 17 and 18. The poppet seat insert 84 clamps a shoulder formed in the insert 100 against an internal shoulder formed in the body section 18, as indicated by the reference character 104, thereby locking the position of the insert 100. The insert 100 includes a stepped bore 102 that communicates with the passages 90.

The bore 102 of the insert 100 allows the poppet assembly 80 to freely move towards and away from the poppet seat 82. The poppet assembly 80 comprises a sleeve 110, a poppet sub-assembly 112 that mounts the poppet valve 81, a threaded adjustment screw 114, and a range spring 116 captured between the poppet sub-assembly 112 and the adjustment screw 114. The sleeve 110 includes an internal bore 118 having a threaded portion for threadedly receiving the adjustment screw 114 and includes an internal shoulder 119 against which a radial extending flange 120 of the poppet subassembly 112 abuts to establish the right most position of the poppet valve 81 as viewed in FIG. 1. A plurality of radially directed ports 122 exhausts fluid pressure from behind the poppet sub-assembly 112 into an enlarged diameter portion of the insert bore 102 that communicates with the passages 90. The adjustment screw 114 includes a fluid venting passage having an axial portion 123a communicating with the interior of the poppet assembly sleeve 110, and a radial portion 123b communicating with the bore 23. A return spring 124 biases the poppet assembly 80 away from the poppet seat 82.

An armature 130 is slidably supported within the valve bore 23 immediately adjacent the insert 100 and hence the poppet assembly 80. Energization of the solenoid assembly 12 induces movement in the armature 130 which in turn engages the end of the sleeve 110 and moves the poppet assembly 80 to the right until a radial face 132 of the sleeve 110 abuts the seat insert 84. This movement in the poppet assembly causes the poppet 81 to engage the poppet seat 82 preventing fluid flow out of the bore 96. The sleeve 110 in cooperation with the insert 84 serves as a stop to limit the rightward movement of the armature 130, as viewed in FIG. 1. The positive armature abutment formed by the sleeve 110 when abutting the insert 84, provides a fixed air gap and thus defines the limits of travel of the armature, independent of adjustments to the range spring 116.

Figure 2:
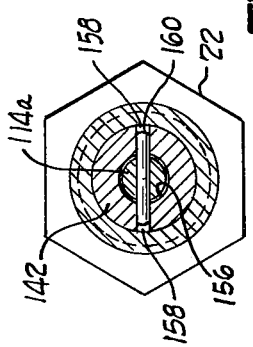
FIG. 2 is a sectional view of the adjustment stem for the control valve as seen from the plane indicated by the line 2—2 of FIG. 1.

In accordance with the invention, the biasing force on the poppet sub-assembly (112) exerted by the spring 116 is adjustable from outside the control valve. The adjusting screw 114 includes an axially extending shaft 114a engageable with an adjusting stem 142. The adjustment stem 142 is mounted for rotation in the valve body 10, in axial alignment with the armature 130 and the poppet assembly 80, the armature 130 being intermediate the stem 142 and the poppet assembly 80. Referring to both FIGS. 1 and 2, the adjusting stem 142 is held within the control valve bore 23 by an internal shoulder 144 against which an external shoulder of the adjusting stem 142 abuts. The adjusting stem 142 carries an O-ring 148 that sealing engages the bore 23 to prevent fluid leakage out of the valve body. A threaded portion 152 of the adjusting stem extends outside the valve and threadedly receives a locknut 154 which when tightened, prevents relative movement between the adjusting stem 142 and the valve bore 23, in both the axial and radial directions. The threaded portion 152 preferably includes a hex-shaped bore 155 for receiving an adjusting implement.

The stem 142 includes a blind bore 156 and a diametral slot 158 for engaging a pin 160 extending diametrically from the shaft 114a. The engagement between the slot 158 and the pin 160 allows the shaft 114a to move axially with respect to the stem 142 but prevents relative rotation between the two elements. Thus it can be seen that rotation of the adjustment stem 142 effects rotation and attendant axial displacement of the adjusting screw 114 within the sleeve 110. After an adjustment has been made, the locknut 154 is tightened to prevent rotation of the adjusting stem 142. It should be noted that rotation of the stem 142 does not cause axial movement in the stem itself, but only in the adjusting screw 114.

In the preferred embodiment, the poppet assembly 80 is rotatably supported by the insert 100. To make a range spring adjustment, the control valve must be activated so that the poppet sleeve 110 is clamped between the armature 130 and the seat insert 84. The resulting frictional engagement between these components resists the rotation of the sleeve 110 within the insert 100. In order to further inhibit rotation during a range spring adjustment, the sleeve 110 is preferably constructed of a magnetically permeable material so that the energization of the solenoid will magnetically lock the poppet assembly 80 to the insert 100. Thus, in the preferred embodiment, the solenoid coil 12 must be energized to adjust the spring force on the poppet. Although this construction is preferred, a non-rotational engagement, i.e. splines, keyway, or the like, between the poppet assembly 80 and the insert 100 is also contemplated in this invention.

A radial end wall 162 of the stem 142 acts as a stop for the armature 130 and establishes the deenergized position of the armature when the stem 142 is fixed by the locknut 154. With the locknut 154 removed, the adjusting stem 142 is axially displaceable in the internal bore 23. This construction provides an outstanding feature of the invention, for it allows the control valve to be mechanically acuated even though the solenoid is not energized. As seen in FIG. 1, displacing the adjusting stem 142 to the right will cause movement in the armature 130 which in turn will displace the poppet assembly 80 to the right, causing the poppet 81 to contact its associated seat 82, preventing fluid flow out of the bore 96. This construction then, allows the control valve to be activated either remotely by energization of the solenoid 12 to cause rightward movement in the armature 130, or manually by directly applying an axial force to the adjusting stem 142 to cause movement in the armature 130.

The operation of the control valve is as follows: Pressurized fluid entering the inlet 47a impinges on the piston surface 56a and urges the piston 56 towards the left, as viewed in FIG. 1. The orifice 64 in the piston 56 communicates the pressure at the inlet to the spring side of the piston. With the control valve deenergized, the poppet assembly 80 assumes the position shown in FIG. 1 and thus any pressurized fluid communicated to the spring side of the piston 56 will flow through the orifice 93a into the bores 94, 96, 98 and eventually be exhausted into the outlet 72a by way of the passages 90, 92 and 34. The depletion of pressurized fluid on the spring side of the piston 56 will cause a fluid pressure imbalance across the orifice 64. The inlet fluid pressure will then overcome the spring force of the spring 62 and move the piston 56 towards the left, exposing the ports 46.

When the coil assembly 12 is energized or alternately, when the stem 142 is manually displaced to the right (as seen in FIG. 1), the armature 130 will drive the poppet assembly 80 towards the right and cause the poppet 81 to contact its associated seat 82 and prevent fluid flow out of the bore 96. The inlet fluid pressure communicated to the spring side of the piston by the orifice 64 will apply a piston closure force to the surfaces 56b which in combination with the spring force applied by the spring 62 will move the piston 56 to the right and interrupt fluid flow between the inlet 47a and the radial passages 46.

The fluid pressure forces applied to the spring side of the piston are communicated to the poppet 81 by the orifice 93a and the bores 94, 96 and 98. As discussed earlier, when the control valve is energized, the poppet assembly 80 is driven to its right most position by the armature 130 causing the poppet 81 to engage the poppet seat 82. The engagement between the poppet 81 and the seat 82 is maintained by the range spring 116, the spring force being adjustable by the adjustment screw 114. As long as the fluid forces transmitted through the orifice 93a to the poppet 81, do not exceed the poppet closure force exerted by the spring 116, the poppet will remain seated. If the inlet fluid pressure however, exceeds a predetermined value (determined by the setting of the range spring 116), the poppet 81 will unseat and fluid will be discharged from the end bore 96 into the outlet 72a (by way of the passages 90, 92 and 34). If the fluid discharged through the bore 96 is sufficient to reduce the inlet pressure below the predetermined value, the poppet 81 will reclose and seal off communication between the spring side of the piston and the outlet 72a. Should the inlet pressure again exceed the predetermined value, the poppet 81 will again reopen and discharge fluid from the spring side of the piston. As long as the fluid discharged through the end bore 96 reduces the inlet fluid pressure below the pre-determined level, the primary piston 56 will remain in its right most position. In effect, the poppet 81 will modulate the fluid flow through the seat 82 to maintain system pressure below the pre-set limit. The maximum flow rate that can be sustained before the primary piston will open is primarily determined by the size of the orifices 93a and 64.

If the pre-set pressure level is greatly exceeded, the fluid discharged through the end bore 96 will be insufficient to reduce the inlet fluid pressure and thus a substantial pressure differential will be established across the orifice 64 and result in primary piston movement towards the left. The excessive inlet fluid pressure will then be dumped directly into the valve outlet 72a through the radial passages 46. Once the inlet fluid pressure has been reduced below the pre-determined level, the poppet 81 will reengage its seat 82 thereby allowing fluid pressure on the spring side of the piston to develop a balancing force on the surfaces 56b, enabling the spring 62 to effect piston movement to the right to interrupt fluid flow between the inlet 47a and the radial passages 46.

Although the invention has been described to a certain degree of particularity, it should be understood by those skilled in the art and various changes and modifications can be made to it without departing from the spirit or scope of the invention as described and herein after claimed.

What is claimed is:

1. In a multi-stage, solenoid controlled pressure relief valve, having a valve body defining an inlet and an outlet, the improvement comprising:
   (a) a primary piston slidably supported within said body for controlling the flow of pressurized fluid from the inlet to the outlet;
   (b) a poppet valve assembly including a poppet engageable with a valve seat for controlling the application of the fluid pressure to an effective pressure area on said primary piston such that upon predetermined movement of said assembly said poppet engages said valve seat, causing a balancing fluid pressure to be applied to said effective pressure area to maintain said piston in a position, interrupting flow between said inlet and said outlet;
   (c) said poppet valve assembly further comprising an axial displaceable sleeve slidably supporting said poppet near one end said sleeve slidably supported within said valve body, an adjustment means threadedly received by said sleeve, and a range spring captured in said sleeve intermediate said adjustment means and said poppet valve;
   (d) said adjustment means including an axially extending shaft including a diametrically extending pin on one end;
   (e) a rotatable adjustment stem engageable with said pin on said shaft and extending outside said valve body such that when said stem is rotated, said shaft is concurrently rotated and said adjustment means is rotated and axially displaced within said sleeve thereby providing a means for adjusting said biasing spring, externally of said valve body; and,
   (f) a solenoid coil and armature means for effecting movement of said poppet valve assembly towards or away from said valve seat upon energization of said coil to move said sleeve axially within said valve body to effect engagement between said poppet and said valve seat.

2. The valve of claim 1 wherein said adjustment stem includes a lock nut for fixing said stem position after an adjustment has been made.

3. The valve of claim 1 wherein said adjustment means includes a communicating axial and radial passages for venting any fluid pressure present between said adjustment means and said poppet.

4. A solenoid operated multi-stage pressure relief valve, comprising:
   (a) a valve body;
   (b) a poppet valve assembly including a sleeve slidably supported within said valve body;
   (c) a poppet slidably supported by said sleeve and engageable with a valve seat upon predetermined movement of said poppet assembly;
   (d) a poppet spring for establishing a biasing force on said support;
   (e) an adjustment means threadedly received by said sleeve for adjusting said poppet spring;
   (f) said adjustment means including an axially extending shaft;
   (g) an armature for effecting movement of said poppet assembly;
   (h) a rotatable stem extending from one end of said body engageable with said adjustment means such that when said stem is rotated said shaft is concurrently rotated and said adjustment means is rotated and axially displaced within said sleeve;
   (i) said stem disposed immediately adjacent said armature and axially movable with respect to said armature such that movement of said stem toward said armature causes substantially concurrent movement in said armature and said poppet valve assembly sleeve to effect manual actuation of the solenoid operated valve; and,
   (j) a solenoid coil mounted to said valve body, operative to induce movement in said armature upon energization of said coil to move said sleeve axially within said valve body to effect engagement between said poppet and its associated seat.

5. A two stage solenoid-operated pressure relief valve, being manually activatable, comprising:
   (a) a valve body having a multistep bore therethrough;
   (b) a second stage valve assembly mounted to said valve body and including a primary piston for controlling fluid flow between an inlet and an outlet;
   (c) a poppet valve assembly including a sleeve slidably mounted within said valve body bore including a poppet engageable with an associated seat for controlling the application of balancing fluid forces to the primary piston in said second stage assembly;
   (d) said poppet assembly further including a range spring for biasing said poppet toward said valve seat, said sleeve slidably supporting said poppet;
   (e) an adjustment means threadedly received by said sleeve for adjusting the biasing force exerted by said range spring on said poppet;
   (f) a rotatable stem extending from one end of said valve body bore in coaxial alignment with said poppet assembly;

(g) a solenoid armature disposed in said valve body bore in coaxial alignment with and intermediate the stem and the poppet assembly;

(h) said adjustment means including an axial extending shaft extending through a coaxial bore in said armature and engageable with said rotatable stem such that rotation of said stem effects concurrent rotation of said shaft and rotation and axial displacement of said adjustment means in said sleeve;

(i) said stem being axially displaceable within said valve body bore to cause abutting engagement and movement in said armature and poppet assembly to effect seating engagement between said poppet and its associated seat; and, (j) a solenoid coil operative to induce movement in said armature towards the poppet valve assembly upon energization of said coil to move said sleeve axially within valve body to effect engagement between said poppet and its associated seat.

6. The solenoid-operated valve of claim 5 further including clamping means for inhibiting rotation of said sleeve when the biasing force on the poppet is being adjusted.

7. A solenoid operated multi-stage pressure relief valve, comprising:

(a) a valve body;

(b) a poppet valve assembly including a sleeve slidably supported within said valve body for movement towards and away from an associated valve seat;

(c) a poppet slidably supported by said sleeve and engageable with said valve seat upon predetermined movement in said poppet assembly;

(d) a poppet spring for establishing a seat biasing force on said poppet when said poppet engages said valve seat;

(e) an adjustment means threadedly received by said sleeve for adjusting the force on said poppet biasing spring;

(f) said adjustment means including an axially extending shaft;

(g) a rotatable stem extending from said body engageable with said adjustment means such that when said stem is rotated said shaft is concurrently rotated and said adjustment means is rotated and axially displaced within said sleeve;

(h) an armature and an associated solenoid coil operative to cause movement in said poppet valve assembly upon energization of said coil to move said sleeve axially within said valve body to effect engagement between said poppet and its associated seat; and, (i) frictional clamping means operative when said solenoid is energized to prevent rotation of said sleeve when said stem is rotated.

8. The solenoid operated valve of claim 7 wherein said rotatable stem is disposed immediately adjacent said armature and is axially movable with respect to said armature such that movement of said stem toward said armature causes substantially concurrent movement in said armature and said poppet valve assembly sleeve to effect manual actuation of the solenoid operated valve.

* * * * *